(12) United States Patent
Kuroda

(10) Patent No.: US 7,848,202 B2
(45) Date of Patent: Dec. 7, 2010

(54) APPARATUS FOR MANUFACTURING INFORMATION RECORD MEDIUM, INFORMATION RECORD MEDIUM, INFORMATION RECORDING APPARATUS AND INFORMATION RECORDING METHOD

(75) Inventor: Kazuo Kuroda, Tokorozawa (JP)

(73) Assignee: Pioneer Corporation, Tokyo-to (JP)

( * ) Notice: Subject to any disclaimer, the term of this patent is extended or adjusted under 35 U.S.C. 154(b) by 35 days.

(21) Appl. No.: 12/457,255

(22) Filed: Jun. 4, 2009

(65) Prior Publication Data

US 2009/0245061 A1    Oct. 1, 2009

Related U.S. Application Data

(60) Division of application No. 11/252,729, filed on Oct. 19, 2005, now abandoned, which is a continuation of application No. 10/742,845, filed on Dec. 23, 2003, now Pat. No. 7,206,270, which is a division of application No. 09/575,530, filed on May 22, 2000, now Pat. No. 6,700,843.

(30) Foreign Application Priority Data

May 20, 1999 (JP) ............... P11-140636

(51) Int. Cl.
*G11B 7/00* (2006.01)

(52) U.S. Cl. ............... 369/59.25; 369/47.22; 369/47.27

(58) Field of Classification Search ............... 369/275.3, 369/47.1, 47.27, 44.26, 44.13, 47.22, 59.25, 369/53.35, 47.37

See application file for complete search history.

(56) References Cited

U.S. PATENT DOCUMENTS

| | | | |
|---|---|---|---|
| 5,729,516 A | 3/1998 | Tozaki et al. | |
| 5,752,009 A | 5/1998 | Nakahara et al. | |
| 5,764,610 A | 6/1998 | Yoshida et al. | |
| RE35,839 E | 7/1998 | Asai et al. | |
| 5,822,281 A | 10/1998 | Yumita | |
| 5,940,364 A | 8/1999 | Ogata et al. | |
| 5,963,536 A | 10/1999 | Vasic et al. | |
| 6,031,815 A | 2/2000 | Heemskerk | |
| 6,078,559 A | 6/2000 | Takemura et al. | |
| 6,104,684 A | 8/2000 | Moriyama et al. | |
| 6,118,741 A | 9/2000 | Mimnagh et al. | |
| 6,118,744 A | 9/2000 | Sturgeon et al. | |

(Continued)

FOREIGN PATENT DOCUMENTS

DE    41 14 234 A1    11/1991

(Continued)

*Primary Examiner*—Nabil Z Hindi
(74) *Attorney, Agent, or Firm*—Drinker Biddle & Reath LLP

(57) ABSTRACT

On an information record medium (10, 11), record information can be recorded one time or a plurality of times by a predetermined record format. An apparatus for manufacturing the information record medium by using a stamper (27, 28) is provided with an embossed pit array forming device (20 to 26, 50) for forming on the stamper as an embossed pit array, pre-record data (SFi) which is a predetermined data row to disable overwriting on the record information in a pre-record area, which is set in advance in a range including an area (13c) assigned to information required to control a reproduction of the record information, which is recorded by the predetermined record format.

9 Claims, 11 Drawing Sheets

U.S. PATENT DOCUMENTS

| | | |
|---|---|---|
| 6,122,245 A | 9/2000 | Kondo et al. |
| 6,128,273 A | 10/2000 | Horie et al. |
| 6,233,219 B1 | 5/2001 | Hori et al. |
| 6,266,299 B1 | 7/2001 | Oshima et al. |
| 6,272,089 B1 | 8/2001 | Kato |
| 6,396,798 B1 | 5/2002 | Takemura et al. |
| RE37,808 E | 7/2002 | Yokota |
| 6,707,774 B1 | 3/2004 | Kuroda et al. |
| 6,850,477 B2 | 2/2005 | Van Deb Enden |

FOREIGN PATENT DOCUMENTS

| | | |
|---|---|---|
| EP | 0 482 645 A2 | 4/1992 |
| EP | 0 759 611 A2 | 2/1997 |
| EP | 0 837 470 A2 | 4/1998 |
| JP | 04-082039 | 3/1992 |
| WO | 98/47135 | 10/1998 |

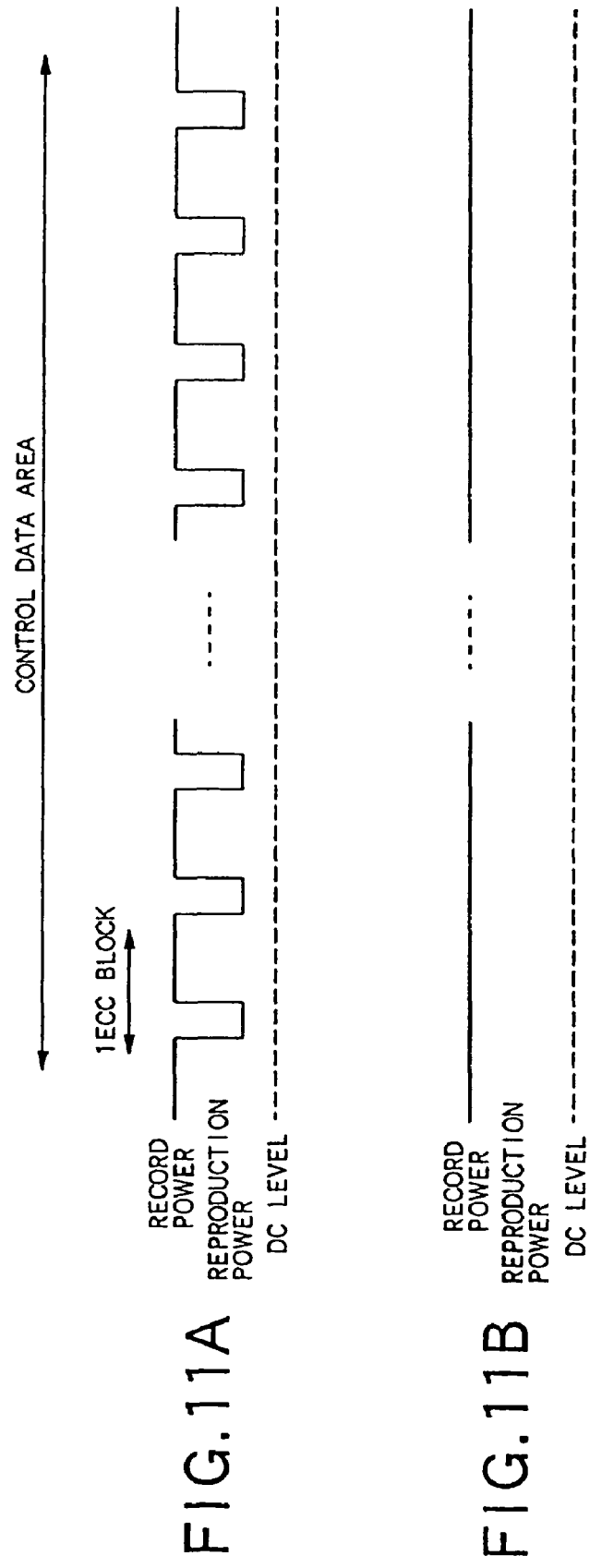

APPARATUS FOR MANUFACTURING INFORMATION RECORD MEDIUM, INFORMATION RECORD MEDIUM, INFORMATION RECORDING APPARATUS AND INFORMATION RECORDING METHOD

This is a divisional application of application Ser. No. 11/252,729, filed on Oct. 19, 2005, now abandoned which is a continuation of prior application Ser. No. 10/742,845, filed on Dec. 23, 2003, now U.S. Pat. No. 7,206,270, which is a divisional of prior application Ser. No. 09/575,530, filed on May 22, 2000, now U.S. Pat. No. 6,700,843, the disclosures of which are incorporated by reference herein in their entireties.

BACKGROUND OF THE INVENTION

Field of the Invention

The present invention relates to an apparatus for manufacturing an information record medium, the information record medium, an information recording apparatus and an information recording method, which can effectively avoid an illegal copy of record information recorded on the information record medium, such as a DVD or the like.

In recent years, an optical disc having a large storage capacity represented by a DVD has been rapidly popularized as an information record medium for recording thereon various contents such as image, voice and the lie. Those contents recorded as digital data on the information record medium such as a DVD or the like are typically protected by copyrights. Thus, it is necessary to take some measures to avoid those contents from being illegally copied to other record media.

As one of the countermeasures against the illegal copy, there is a method of carrying out a scramble by using key data written to a predetermined area when the contents are reproduced from the information record medium. For example, in a case of a DVD format, such key data is written together with copy prohibition information as control data in a lead-in area, so that it is possible to avoid the illegal copy of the information record medium.

However, there may be such a case that, for the information record medium in which the copy is prohibited as mentioned above, the hard copy is tried to another information record medium as a whole irrespectively of the content of the key data of the scramble or the copy prohibition information, by reading an RF (Radio Frequency) signal from DVD-ROM or the like. Recently, a DVD recordable (DVD-R) type, to which information can be recorded only one time, and a repeatedly recordable DVD rewritable (DVD-RW) type are developed. Thus, by writing the above-mentioned RF signal onto the DVD-R or the DVD-RW, it is possible to produce an optical disc having the same data content as that of the original information record medium. This results in the infringement of copyright.

SUMMARY OF THE INVENTION

The present invention is proposed in view of the above mentioned problems. It is therefore an object of the present invention to provide a writable information record medium in which an illegal copy of the information record medium can be effectively protected even if a hard copy is tried by reading an RF signal from the information record medium, an apparatus for manufacturing such an information record medium, and an information recording apparatus for and an information recording method of recording information onto such an information record medium.

The above object of the present invention can be achieved by an apparatus for manufacturing an information record medium, on which record information can be recorded one time or a plurality of times by a predetermined record format, by using a stamper. The manufacturing apparatus is provided with an embossed pit array forming device for forming on the stamper as an embossed pit array, pre-record data which is a predetermined data row to disable overwriting on the record information in a pre-record area, which is set in advance in a range including an area assigned to information required to control a reproduction of the record information, which is recorded by the predetermined record format.

In one aspect of the manufacturing apparatus of the present invention, the information record medium has a lead-in area located prior to a data area where the record information is recorded, and the pre-record area is located in a control data area within the lead-in area.

In this case, the record information may be recorded on the information record medium by a DVD format, and the pre-record area may be set in an arrangement including at least a record area for predetermined control information in the control data area, same arrangement being repeated over a plurality of continuous ECC blocks each having a same data structure.

Further, a lead position of the pre-record area may be set in an arrangement not overlapping with a synchronization code located at a lead of each synchronization frame constituting the ECC blocks.

In another aspect of the manufacturing apparatus of the present invention, the manufacturing apparatus is further provided with a wobbling amplitude varying device for increasing an amplitude of wobbling in the pre-record area, with respect to an information record medium to which wobbling is applied by wobbling a record track, on which the record information is recorded, at a constant frequency.

According to the manufacturing apparatus of the present invention, when cutting the stamper to manufacture the information record medium, the pre-record area is judged and the embossed pit array corresponding to the pre-record data is formed in this pre-record area. Then, the same embossed pit array is formed on the information record medium manufactured by using this stamper, so that another record information cannot be overwritten on the embossed pit array. Especially, if it is tried to copy all of the data of another information record medium, which is exclusive for reproduction and whose record format is common, onto this information record medium produced by the present invention, the information required to perform the reproduction control such as the key data for scramble etc., is missed. Consequently, it is possible to effectively avoid the illegal copy.

Here, in the manufacturing apparatus of the present invention, in case of manufacturing the information record medium having the lead in area including the control data area, it is preferable to set the pre-record area in this control data area. By this, it is possible to appropriately avoid overwriting with respect to various control information.

Also, in the manufacturing apparatus of the present invention, in case of manufacturing the information record medium based on the DVD format, it is preferable that the arrangement of the pre-record area is set such that it covers the predetermined control information in the control data area and that, if the ECC blocks each having the same data structure are repeated, the same arrangement of the pre-record area is repeated over those ECC blocks. By this, it is possible to avoid the illegal copy from the information record medium, on which the key data for scramble etc., is written in the disc production information.

Also, in the manufacturing apparatus of the present invention, it is preferred that the boundary of the pre-record area is not overlapped with the synchronization code, which is set at the lead when the respective ECC block is divided into synchronization frames. By this, at the time of reproducing the record information, it is possible to certainly detect the synchronization code.

Further, in the manufacturing apparatus of the present invention, it is preferable, in case of manufacturing the DVD etc., to which wobbling is applied, to cut the stamper such that the amplitude of the wobbling is increased at the portion where the embossed pit array is formed. By this, it is possible to compensate the reduction in the level of the wobbling signal as the reflection light amount from the record track is reduced due to the formation of the embossed pit array.

The above object of the invention can be also achieved by an information record medium, on which record information can be recorded one time or a plurality of times by a predetermined record format. The information record medium is provided with: a pre-record area set in advance in a range including an area assigned to information required to control a reproduction of the record information, which is recorded by the predetermined record format; and pre-record data formed as an embossed pit array which is a predetermined data row to disable overwriting on the record information in the pre-record area.

In one aspect of the information record medium of the present invention, the information record medium has a lead-in area located prior to a data area where the record information is recorded, and the pre-record area is located in a control data area within the lead-in area.

In this case, the record information may be recorded on the information record medium by a DVD format, and the pre-record area may be set in an arrangement including at least a record area for predetermined control information in the control data area, same arrangement being repeated over a plurality of continuous ECC blocks each having a same data structure.

Further in this case, a lead position of the pre-record area may be set in an arrangement not overlapping with a synchronization code located at a lead of each synchronization frame constituting the ECC blocks.

In another aspect of the information record medium of the present invention, wobbling is applied by wobbling a record track, on which the record information is recorded, at a constant frequency, and an amplitude of wobbling in the pre-record area is higher than that in other areas.

According to the information record medium of the present invention, the embossed pit array corresponding to the pre-record data is formed in the pre-record area of the information record medium, on which the record information can be recorded one time or a plurality of times such as a DVD-R or DVD-RW. Thus, in this portion, other record information cannot be overwritten. Especially, if it is tried to copy all of the data of another information record medium, which is exclusive for reproduction and whose record format is common, onto this information record medium of the present invention, the information required to perform the reproduction control such as the key data for scramble etc., is missed. Consequently, it is possible to effectively avoid the illegal copy.

Here, in case of the information record medium having the lead in area including the control data area, it is preferable to set the pre-record area in this control data area. By this, it is possible to appropriately avoid overwriting with respect to various control information.

Also, in case of the information record medium on which the record information is recorded by the DVD format, it is preferable that the arrangement of the pre-record area is set such that it covers the predetermined control information in the control data area and that, if the ECC blocks each having the same data structure are repeated, the same arrangement of the pre-record area is repeated over those ECC blocks. By this, it is possible to avoid the illegal copy from the information record medium, on which the key data for scramble etc., is written in the disc production information.

Also, it is preferred that the boundary of the pre-record area is not overlapped with the synchronization code, which is set at the lead when the respective ECC block is divided into synchronization frames. By this, at the time of reproducing the record information, it is possible to certainly detect the synchronization code.

Further, it is preferable, in case of the DVD etc., to which wobbling is applied, to cut the stamper such that the amplitude of the wobbling is increased at the portion where the embossed pit array is formed. By this, it is possible to compensate the reduction in the level of the wobbling signal as the reflection light amount from the record track is reduced due to the formation of the embossed pit array.

The above object of the present invention can be also achieved by a first information recording apparatus for recording record information onto an information record medium by a predetermined record format. The first information recording apparatus is provided with: an area judging device for judging a pre-record area, which is set in advance in a range including an area assigned to information required to control a reproduction of the record information, which is recorded by the predetermined record format, with respect to an information record medium on which the record information can be recorded one time and on which an embossed pit array is not formed in the pre-record area; and a pre-record data writing device for writing pre-record data, which is a predetermined data row to disable overwriting on the record information, by laser-recording with respect to the pre-record area judged by the area judging device.

According to the first information recording apparatus of the present invention, in advance of actually recording the record information onto the information record medium, the pre-record area is judged, and if the embossed pit array is not formed in this judged pre-record area, it is performed to write the pre-record data by laser recording. Then, since writing the record information onto this information record medium can be performed only one time, it is not possible to overwrite another record information in the pre-record area. Especially, if it is tried to copy all of the data of another information record medium, which is exclusive for reproduction and whose record format is common, onto this information record medium produced by the present invention, the information required to perform the reproduction control such as the key data for scramble etc., is missed. Consequently, it is possible to effectively avoid the illegal copy.

The above object of the present invention can be also achieved by a second information recording apparatus for recording record information onto an information record medium by a predetermined record format with irradiating a light beam at a predetermined power onto the information record medium. The second information recording apparatus is provided with: a pre-record data judging device for judging whether pre-record data, which is a predetermined data row to disable overwriting on the record information, is formed as an embossed pit array or is formed by laser recording with respect to the information record medium on which the pre-record data has been already written; a modulation degree judging device for judging whether a modulation degree of a detection signal based on the pre-record data is low as compared with a predetermined reference; and a power controller for controlling a power of the light beam to be a record power for the pre-record area if the pre-record data is judged to be formed as the embossed pit array and if the modulation degree is judged to be low, and controlling the power of the light beam to be smaller than the record power for the pre-record area if the pre-record data is not judged to be formed as the embossed pit array or if the modulation degree is not judged to be low.

In one aspect of the first or second information recording apparatus of the present invention, the information record medium has a lead-in area located prior to a data area where the record information is recorded, and the pre-record area is located in a control data area within the lead-in area.

In this case, the record information may be recorded on the information record medium by a DVD format, and the pre-record area may be set in an arrangement including at least a record area for predetermined control information in the control data area, same arrangement being repeated over a plurality of continuous ECC blocks each having a same data structure.

Further in this case, a lead position of the pre-record area may be set in an arrangement not overlapping with a synchronization code located at a lead of each synchronization frame constituting the ECC blocks.

According to the second information recording apparatus of the present invention, at the time of recording the record information onto the information record medium, on which the pre-record data has been already recorded, it is judged whether this pre-record data is recorded by the embossed pit array or by laser recording, by reading a predetermined flag for example. Further, the high and low relationship of the modulation degree of the detection signal based on the emboss pit array is checked. Then, in case that the emboss pit is formed and if the modulation degrees is low, the power of the light beam is controlled to be the record power. In other cases, the power of the light beam is controlled to be much lower than the record power such as the reproduction power for example. Therefore, it is possible to effectively prevent the modulation degree from being reduced in the detection signal of the pre-record data due to the influence of the pigment film coated on the embossed pit array.

Here, in case of recording the information record medium having the lead in area including the control data area by the first or second information recording apparatus, it is preferable to set the pre-record area in this control data area. By this, it is possible to appropriately avoid overwriting with respect to various control information.

Also, in case of recording the information record medium on which the record information is recorded by the DVD format, it is preferable that the arrangement of the pre-record area is set such that it covers the predetermined control information in the control data area and that, if the ECC blocks each having the same data structure are repeated, the same arrangement of the pre-record area is repeated over those ECC blocks. By this, it is possible to avoid the illegal copy from the information record medium, on which the key data for scramble etc., is written in the disc production information.

Also, it is preferred that the boundary of the pre-record area is not overlapped with the synchronization code, which is set at the lead when the respective ECC block is divided into synchronization frames. By this, at the time of reproducing the record information, it is possible to certainly detect the synchronization code.

The above object of the present invention can be also achieved by a first information recording method of recording record information onto an information record medium by a predetermined record format. The first information recording method is provided with: an area judging process of judging a pre-record area, which is set in advance in a range including an area assigned to information required to control a reproduction of the record information, which is recorded by the predetermined record format, with respect to an information record medium on which the record information can be recorded one time and on which an embossed pit array is not formed in the pre-record area; and a pre-record data writing process of writing pre-record data, which is a predetermined data row to disable overwriting on the record information, by laser-recording with respect to the pre-record area judged by the area judging process.

The above object of the present invention can be also achieved by a second information recording method of recording record information onto an information record medium by a predetermined record format with irradiating a light beam at a predetermined power onto the information record medium. The second information recording method is provided with: a pre-record data judging process of judging whether pre-record data, which is a predetermined data row to disable overwriting on the record information, is formed as an embossed pit array or is formed by laser recording with respect to the information record medium on which the pre-record data has been already written; a modulation degree judging process of judging whether a modulation degree of a detection signal based on the pre-record data is low as compared with a predetermined reference; and a power controller for controlling a power of the light beam to be a record power for the pre-record area if the pre-record data is judged to be formed as the embossed pit array and if the modulation degree is judged to be low, and controlling the power of the light beam to be smaller than the record power for the pre-record area if the pre-record data is not judged to be formed as the embossed pit array or if the modulation degree is not judged to be low.

In one aspect of the first or second information recording method of the present invention, the information record medium has a lead-in area located prior to a data area where the record information is recorded, and the pre-record area is located in a control data area within the lead-in area.

In this case, the record information may be recorded on the information record medium by a DVD format, and the pre-record area may be set in an arrangement including at least a record area for predetermined control information in the control data area, same arrangement being repeated over a plurality of continuous ECC blocks each having a same data structure.

Further in this case, a lead position of the pre-record area may be set in an arrangement not overlapping with a synchronization code located at a lead of each synchronization frame constituting the ECC blocks.

Further in this case, when writing the record information onto the information record medium, the ECC blocks including the pre-record area may be generated by using a parity generated on the basis of the pre-record data and a predetermined data array set in advance.

Alternatively in this case, when writing the record information onto the information record medium, the ECC blocks including the pre-record area may be generated by using a parity, which is modified by applying a reverse operation based on the record data to be written and the pre-record data.

Further in this case, an area to which the reverse operation is to be applied may be judged among an area where the record information is written on the information record medium, and the reverse operation may be applied within the judged area.

According to the first or second information recording method of the present invention, in the same manner as the above described first or second information recording apparatus of the present invention, it is possible to effectively prevent the modulation degree from being reduced in the detection signal of the pre-record data due to the influence of the pigment film coated on the embossed pit array.

Further, it is possible to appropriately avoid overwriting onto various control information. It is possible to effectively avoid the illegal copy from the information record medium, on which the key data for scramble etc., is written in the disc production information for example, while it is possible to detect the synchronization code at the time of reproduction.

Furthermore, according to the information recording method in the aspect that the ECC is generated by using the parity generated on the basis of the pre-record data and the predetermined data array, even if there is mismatching of the parities at the time of generating the ECC blocks due to the pre-record data, it is possible to effectively avoid the illegal copy without introducing a drawback at the time of additionally writing the record information.

Alternatively, according to the information recording method in the aspect that the ECC blocks is generated by using the parity, which is modified by applying the reverse operation, since the mismatching of the parities at the time of generating the ECC blocks due to the pre-record data is cancelled, it is possible to effectively avoid the illegal copy while keeping the error correcting capability enough at the time of additionally writing the record information.

In this case, by applying the reverse operation within the judged area, since the mismatching of the parities at the time of generating the ECC blocks due to the pre-record data is cancelled by means of a relatively simple process, it is possible to effectively and simply avoid the illegal copy while keeping the error correcting capability enough at the time of additionally writing the record information.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 11A is a diagram showing one pattern for a laser power control used in a power controller in the second embodiment; and FIG. 11B is a diagram showing another pattern for the laser power control used in a power controller in the second embodiment.

DETAILED DESCRIPTION OF THE PREFERRED EMBODIMENT

Preferred embodiments of the present invention will be explained below with reference to the drawings. In the following embodiments, a case is described in which the present invention is applied to an apparatus for manufacturing an information record medium, which cuts a stamper disc to manufacture a DVD-R or DVD-RW, and an information recording and reproducing apparatus for recording and reproducing the record information onto and from the DVD-R.

At first, a record format of the DVD-RW in the embodiments is described with reference to FIG. 1 to FIG. 5. The following explanations can be similarly applied to the DVD-R.

Figure 1:
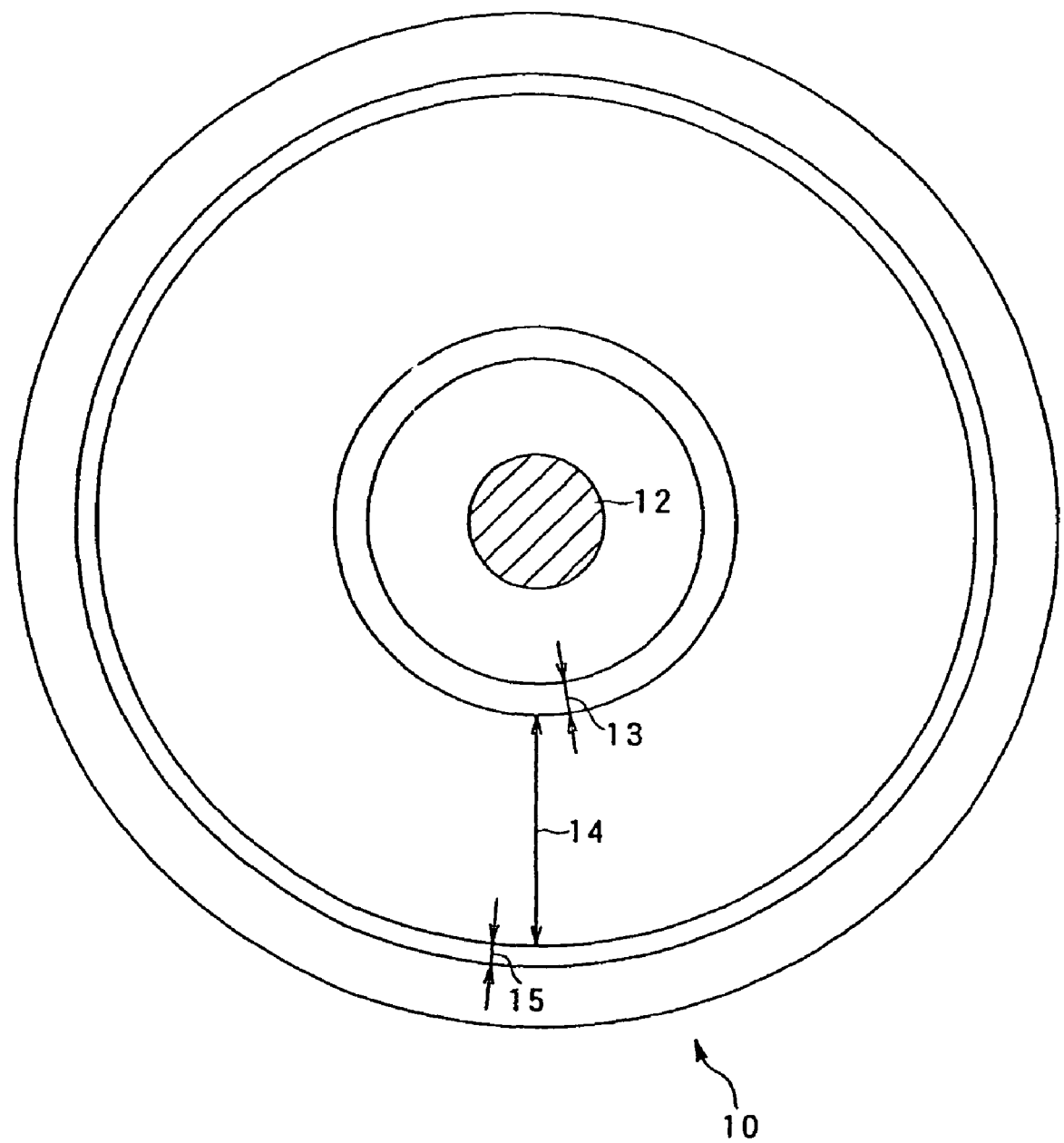
FIG. 1 is a diagram showing a configuration of an information record surface of a DVD-RW in embodiments of the present invention.

FIG. 1 is a diagram showing a configuration of an information record surface of DVD-RW serving as an information record medium in the embodiments.

As shown in FIG. 1, a clamp hole 12 for fixing a DVD-RW 10 when it is rotated is located at a center of the information record surface of the DVD-RW 10. Also, respective areas of a lead-in area 13, a data area 14 and a lead-out area 15 are positioned around a circumference of the DVD-RW 10, in this order of starting from the center. The lead-in area 13 is an area that is firstly accessed at a time of recording or reproducing the DVD-RW 10, and is recorded with information with regard to the DVD-RW 10, various information with regard to record data corresponding to a content, and the like. The data area 14 is an area to which the data corresponding to the content is to be recorded. For example, the content to be recorded may include video data, audio data, data or a program that can be read by a computer and the like. The lead-out area 15 is an area following the data area 14, to which information indicative of the lead-out area 15 is recorded.

Figure 2:
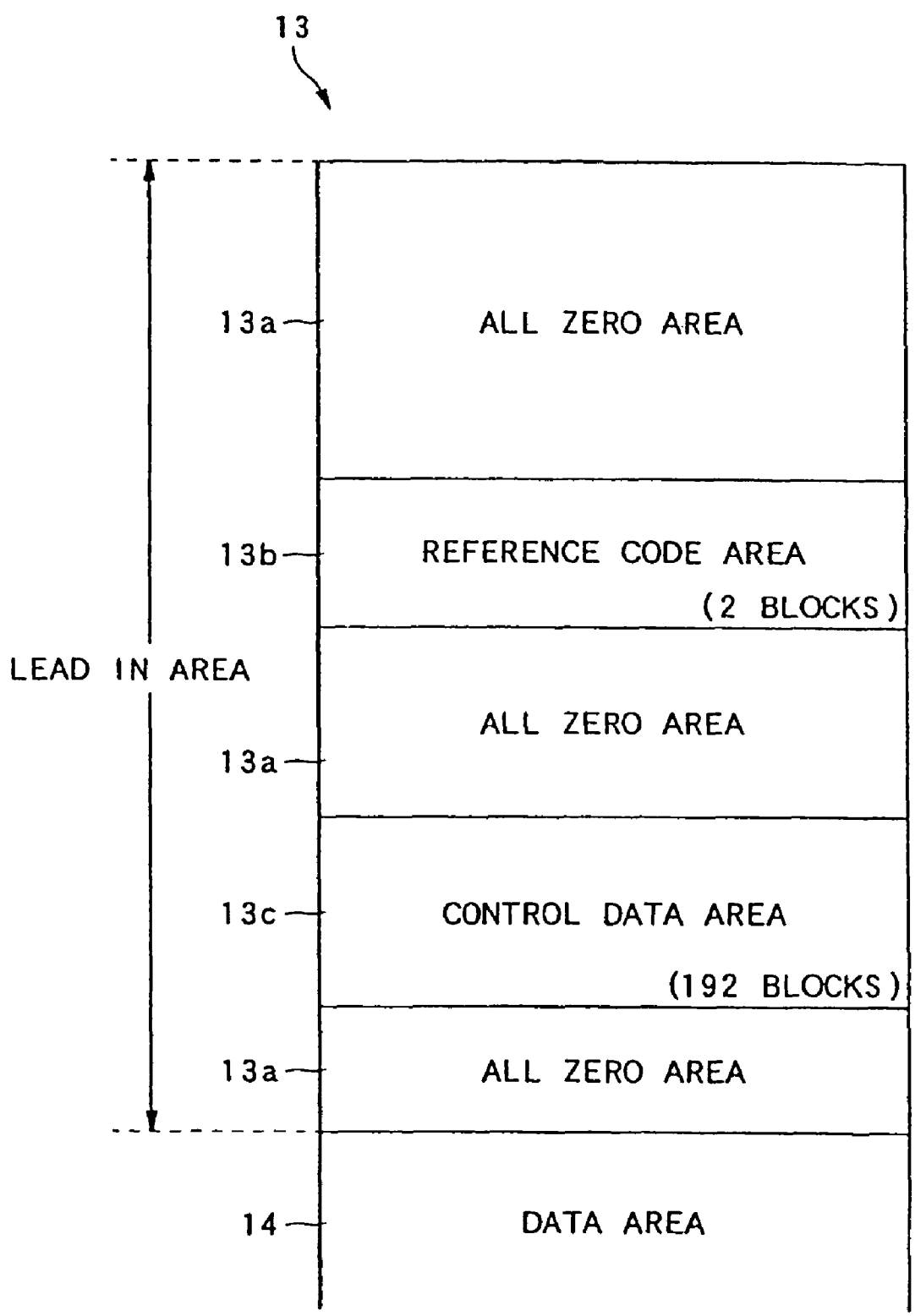
FIG. 2 is a diagram showing a structure of a lead-in area of the DVD-RW in the embodiments.

FIG. 2 is a diagram showing the structure of the lead-in area 13 of the DVD-RW 10 in the embodiments. The lead-in area 13 shown in FIG. 2 is provided with a plurality of all zero areas 13a, in each of which all bit rows are recorded as zero, and a reference code area 13b sandwiched between two of the all zero areas 13a, to which a predetermined pit pattern used for scramble is recorded. Similarly, a control data area 13c, to which various control information is recorded, is sandwiched between two of the all zero areas 13a. Data in these areas is divided by a unit of sector, to which each address is assigned. Also, one ECC block is established for each 16 sectors. The ECC block is a one unit block for an error correction process.

192 continuous ECC blocks are recorded in the control data area 13c. That is, the same control information is repeatedly recorded for 192 times, in the control data area 13c.

Figure 3:
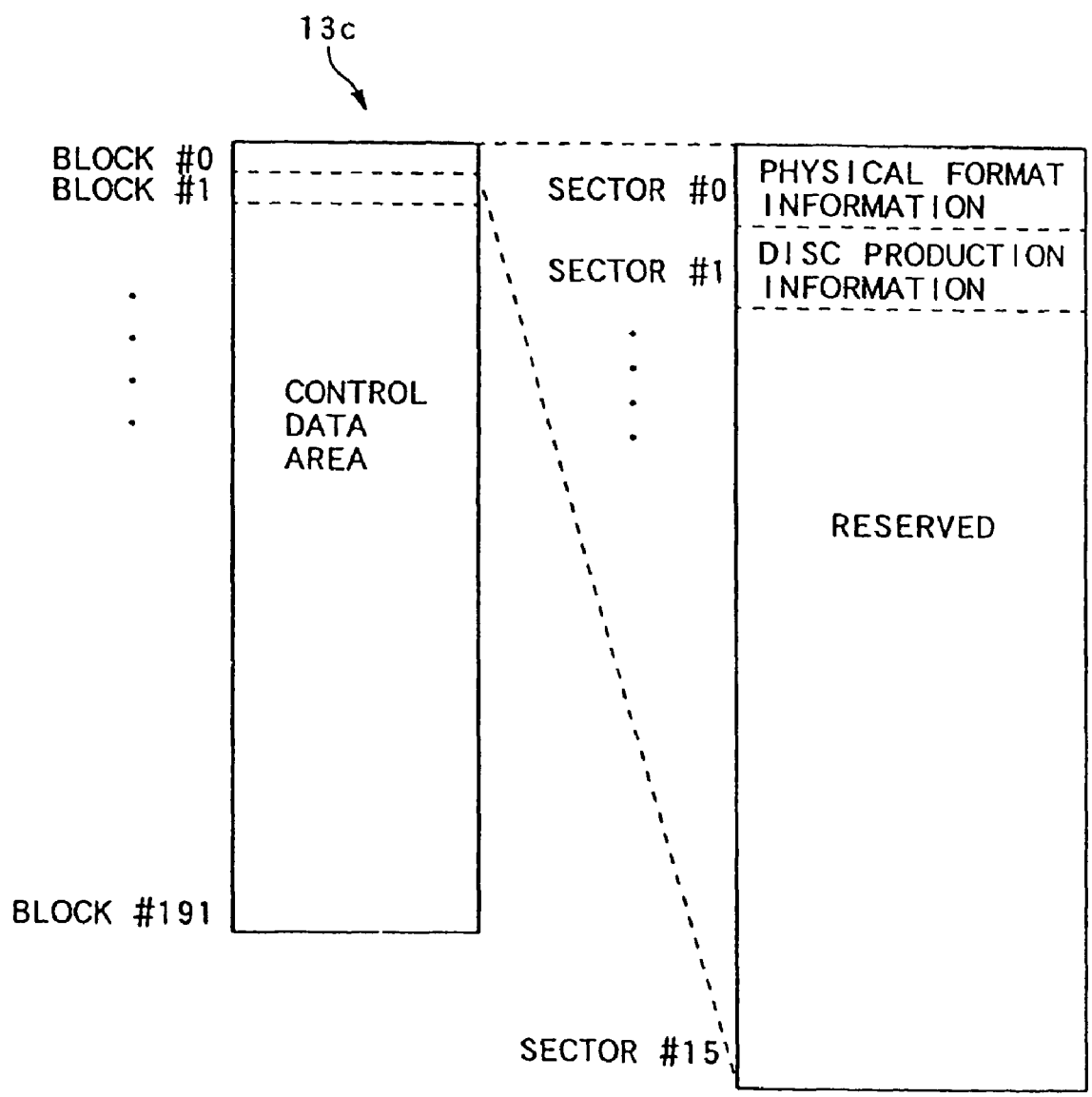
FIG. 3 is a diagram showing a data structure of an ECC block at a lead of a control data area in the embodiments.

FIG. 3 is a diagram showing the data structure of a lead ECC block among the 192 ECC blocks included in the control data area 13c. A basic data structure of each of the other ECC blocks is also similar to that of the lead ECC block. As shown in FIG. 3, the ECC block is provided with physical format information with regard to a format and a kind of a disc, disc production information with regard to a disc production, and a reserved area to which content provider information is recorded for example.

The ECC block is composed of 16 sectors from a sector #0 to a sector #15. Among them, the physical format information is recorded in the lead sector #0. The disc production information is recorded in the next sector #1. The sectors #3 to #15 after that are assigned to the reserved area.

In this embodiment, the countermeasure for protecting the illegal copy of the information record medium is adopted by defining a predetermined area in the ECC blocks of the control data area 13c having the above-mentioned configuration as a pre-record area, and then forming pre-record data, which is set in advance, in the pre-record area as an embossed pit array, for example.

Figure 4:
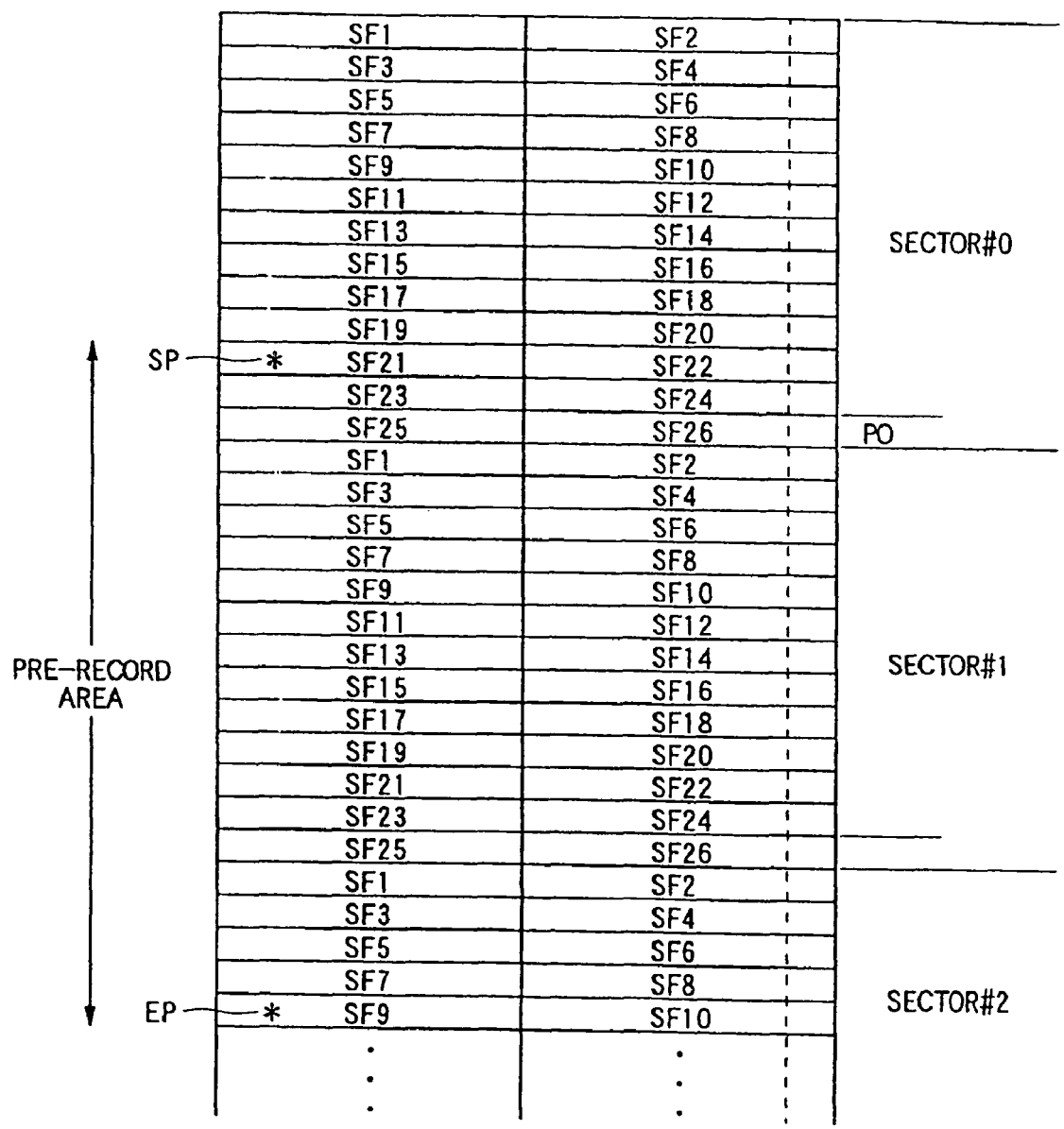
FIG. 4 is a diagram showing a detailed data structure near the lead of the ECC block in the control data area in the embodiments.

FIG. 4 is a diagram showing the further detailed data structure near the lead, in the ECC block of the control data area 13c. That is, each sector is divided into a synchronization frame in which a synchronization code is inserted into a lead for each 92 bytes. One sector is composed of 26 synchronization frames. In FIG. 4, it is indicated as a first synchronization frame SF1 to a twenty-sixth synchronization frame SF26.

The respective synchronization frames are combined as a line (row) for each two synchronization frames. A PO (Parity Out) parity is added to a final line of the sector, and further a PI (Parity In) parity is added to each line. The PO parity and the PI parity are used as outer codes for an error check in the ECC block.

As shown in FIG. 4, this embodiment defines a range from a link start point SP to a link end point EP as the pre-record area. The link start point SP is set at a sixteenth byte of the twenty-first synchronization frame SF21 of the sector #0 in each ECC block, and the link end point EP is set at a fifteenth byte of the ninth synchronization frame SF9 of the sector #2, respectively. In this pre-record area, the pre-record data is recorded, for example, by forming the embossed pit array in a later-described process, on the DVD-RW 10. Alternatively, the pre-record data may be recorded by means of laser-recording if the DVD-R using an organic pigment record film is used.

Namely, the pre-record area in which the pre-record data is recorded is an area that cannot be overwritten by a user in future. Especially, the information necessary to apply the scramble to the DVD-RW 10 cannot be written as the disc production information in the control data area 13c. Thus, it is difficult to release the scramble even if the content of another DVD-ROM in which only the reproduction can be performed is illegally copied to the DVD-RW 10. Therefore, the DVD-RW 10 cannot be used as the information record medium for the illegal copy. On the other hand, the content, to which not only the copy prohibition but also the scramble is not performed, can be normally copied from another DVD-ROM or the like to the DVD-RW 10 according to this embodiment. This is because the content recorded on the DVD-RW 10 can be reproduced independently of the content of the data in the pre-record area, in this case.

By the way, the pre-record area in this embodiment is not limited to the above-mentioned range. It can be freely set in a range as long as it has the effect of protecting the illegal copy, such as a data portion with regard to the scramble.

Here, as shown in FIG. 4, the link start point SP and the link end point EP of the pre-record area are positioned such that they do not overlap with the synchronization code at the lead of each synchronization frame. This is because, if a boundary between the linking portions of the pre-record area coincides with a boundary between the synchronization frames, the synchronization code cannot be surely detected, which may result in a fear that the boundary between the synchronization frames are erroneously detected.

Incidentally, the content of the pre-record data is not especially limited. It can be freely set as long as it is a data array set in advance. For example, it may be set to all zero. However, data portions corresponding to the PO parity and the PI parity in the pre-record data require the following consideration.

That is, mismatching of parities leads to a problem when the pre-record data is recorded in the pre-record area, as shown in FIG. 4. Especially, a data portion of the PO parity within the pre-record area requires the modification to an appropriate value when the content of the corresponding data outside the pre-record area in FIG. 4 is changed. However, the PO parity once recorded in the pre-record area cannot be changed, which results in such mismatching.

In the present embodiments, there may be a possibility that the mismatching occurs on a total of four lines (rows) as the worst case within the ECC block shown in FIG. 4 to thereby bring about a parity error. Actually, the mismatching may occur at:

(1) a line including the link-start point SP;
(2) a line of a final PO parity of the sector #0;
(3) a line of a final PO parity of the sector #1; and
(4) a line including the link end point EP.

Here, the occurrence of the errors at the linking portions of the pre-record area, such as the lines (1) and (4), is caused by a discrepancy between record timings. That is, when a phase of a reproduction clock is deviated by a maximum of 180 degrees, it takes a time corresponding to 1.8 synchronization frames to recover the deviation. Thus, there may be a possibility of an error in the PI parity because of the loss of the data.

Even if the matching of the parities is executed when the pre-record data is recorded, since uncertain data initially exists in the control data area 13c, there may be a large possibility that the mismatching occurs in future. Also, there may be a possibility of an occurrence of a byte error of several bytes on the PO parity lines at the lines (2) and (3) in the worst case. Hence, there may be a large possibility that the correction of the PI parity cannot be done. An ability of the error correction to the PI error in the record format of the DVD-RW 10 corresponds to five bytes. The excess over this value brings about the PI error, and causes the occurrence of the parity error corresponding to the lines (2) and (3).

On the other hand, as the best case, an error does not occur at the linking portion in the pre-record area corresponding to the lines (1) and (4) (if the deviation of the phase in the reproduction clock is small). Also, the parity error does not occur even at the PO parity line if the byte error corresponding to the lines (2) and (3) is within a range for the correction ability of the PI error. After all, the parity error at any of the lines (1) to (4) does not occur in the best case. Actually, the parity error occurs under the distribution in the middle between the worst case and the best case.

By the way, the ability of correcting the error of the PO parity in the record format of the DVD-RW 10 corresponds to 16 lines in the ECC block. Thus, the error can be sufficiently corrected even if the PO parity error corresponding to the four lines (1) to (4) occurs as the worst case. Since the parity error corresponding to the four lines occurs in the worst case, the correction ability corresponding to the 16 lines for the ECC block is reduced substantially to that corresponding to 12 lines. However, this does not result in a special problem if the DVD-RW 10 is used within a usual usage range.

In order not to further sacrifice the correction ability, the linking portion may be installed on the PO parity line. The pre-recorded PO parity line has a high possibility that the matching as the ECC block is not established between the content of the pre-recorded data and the later-recorded data, which makes the possibility of the error higher. Also, the line including the linking portion has a high possibility of the PI error. So, if the linking portion is installed at the PO parity line, it is desirable since the number of lines having the higher error possibility can be reduced from two lines to one line.

Next, the method of generating the data in the ECC block including the pre-record data will be considered below. Most of the data except the pre-record data in the ECC block can be preset as a fixed value. However, the value of a last recorded address included in the above-mentioned physical format cannot be grasped in advance. This last recorded address is data to be updated each time when it is recorded on the DVD-RW 10, since a final address in a range of the recorded data recorded in the data area 14 of the DVD-RW 10 is recorded as the last recorded address. So, in this embodiment, an appropriate value (for example, the all zero) may be set in advance to the last recorded address to then generate the ECC block.

Then, the following three methods are considered as the actual method of generating the ECC block.

A first method generates an ECC block such that the pre-record area is used for the predetermined pre-record data and the other portions are used for the above-mentioned data in the ECC block. Then, in future, a last recorded address is additionally written as having a different value to the ECC block. In this case, although the mismatching of the parities occurs as mentioned above, an appropriate process is carried out depending on the error correction ability in the record format.

A second method once generates an ECC block, similarly to the first method. However, when the ECC block is additionally written in future, a reverse operation with regard to a parity generation is carried out in accordance with the pre-grasped pre-record data. The content of the PO parity is newly obtained and is then updated to additionally write the ECC block.

A third method is a method in which the first and second methods are combined. That is, in the ECC block, a portion in which the mismatching of the parities occurs is limited in advance. In this limited portion, the reverse operation is performed by using the second method. In the other portions, the ECC block is additionally written by using the first method.

Those three methods of generating the ECC block can be appropriately selected and used from view points of the error correction ability necessary for a system, the simplification of the process and the like.

First Embodiment

A first embodiment of the present invention will be described below. Here, a cutting apparatus serving as the apparatus for manufacturing an information record medium, which produces the DVD-R or the DVD-RW having the above-mentioned data structure, will be described below with reference to FIG. 5 to FIG. 7. The cutting apparatus according to the first embodiment is an apparatus for producing a stamper disc for the sake of mass production of an optical disc in which an embossed pit array corresponding to the pre-record area of the present invention is formed.

Figure 5:
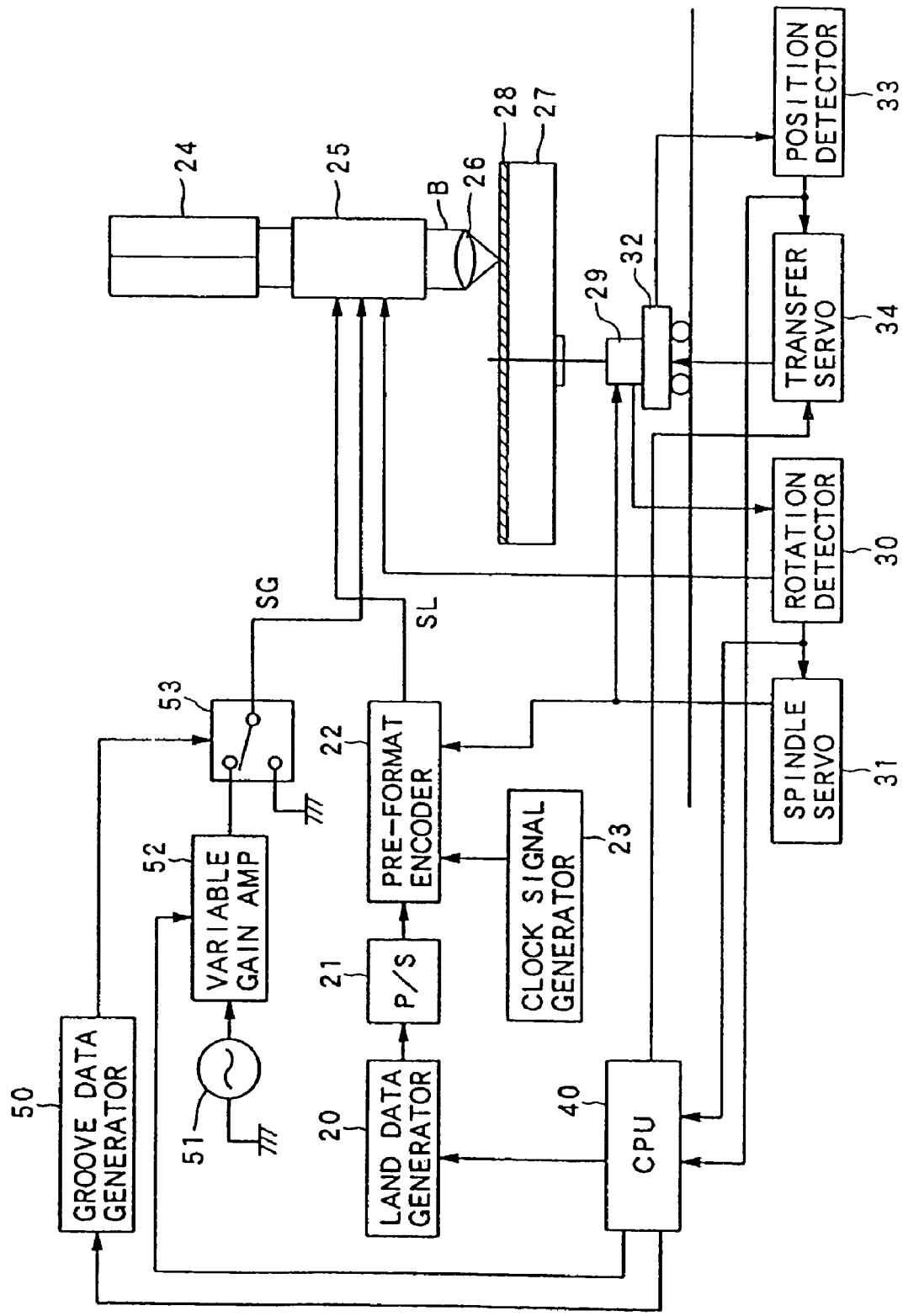
FIG. 5 is a block diagram showing a schematic configuration of a cutting device according to a first embodiment.

FIG. 5 is a block diagram showing the schematic configuration of the cutting apparatus according to the first embodiment. The cutting apparatus shown in FIG. 5 is provided with a land data generator 20, a parallel/serial (P/S) converter 21, a pre-format encoder 22, a clock signal generator 23, a laser generator 24, a light modulator 25, an objective lens 26, a spindle motor 29, a rotation detector 30, a rotation servo circuit 31, a transfer unit 32, a position detector 33, a transfer servo circuit 34, a CPU 40, a groove data generator 50, a wobbling signal generator 51, a variable gain amplifier 52 and a switch 53.

The stamper disc is provided with a glass substrate 27 and a resist 28 coated on the glass substrate 27. As the resist 28 is exposed to light when a later-described light beam B is irradiated, a pit is generated in a form corresponding to the change of a strength of the light beam B.

In FIG. 5, the land data generator 20 outputs parallel data corresponding to a land track and a pre-pit, which is formed to record various control signals in advance, under the control of the CPU 40. The outputted parallel data is converted into a serial data by the parallel/serial converter 21. This serial data is inputted to the pre-format encoder 22. Then, a land data signal SL to actually form the land track and the pre-pit on the stamper disc is generated, in accordance with a clock signal for pre-formatting which is sent from the clock signal generator 23, and is outputted to the light modulator 25.

On the other hand, the groove data generator 50 generates groove data including the pre-record data, which is to form the embossed pit array and the groove track, under the control of the CPU 40, and then outputs it as a control signal to the switch 53.

The wobbling signal generator 51 generates a wobbling signal to give micro wobbling to the groove track. Then, the wobbling signal is outputted to the switch 53 after an appropriate gain is given to the wobbling signal by the variable gain amplifier 52, under the control of the CPU 40.

As mentioned above, the reason why this embodiment has such a configuration that the variable gain amplifier 52 is equipped to make a level of the wobbling signal variable is to give a high amplitude to the wobbling of the portion where the embossed pit array corresponding to the pre-record data is formed, in the groove track. That is, an area of the groove track is reduced correspondingly to the embossed pit array at a time of reproducing the optical disc produced from the stamper disc on which the wobbling is performed. This reduced area drops a level of a reflection light from the groove track, and drops a level of a push-pull signal including the wobbling signal, which thereby has undue influence on the extraction of the wobbling signal. As that countermeasure, the drop of the level of the push-pull signal is canceled out by the adjustment of the gain through the variable gain amplifier 52.to thereby compensate the level of the wobbling signal.

The ground level and the wobbling signal to which the gain is given are inputted to the switch 53, as mentioned above, and a switching control is done in accordance with the groove data outputted from the groove data generator 50. Accordingly, a groove data signal SG to actually form a shape of the groove track on the stamper disc is outputted to the light modulator 25.

The laser generator 24 emits the light beam B to form the groove track and the land track to the stamper disc. The emitted light beam B is modulated by using the land data signal SL and the groove data signal SG by the light modulator 25, and is collected through the objective lens 26 onto the stamper disc.

At this time, the spindle motor 29 rotates the stamper disc, and the rotation detector 30 detects the rotation of the stamper disc. Accordingly, the rotation servo circuit 31 controls the rotation of the stamper disc, and then outputs a rotation pulse synchronous with the rotation.

The position detector 33 detects a position of the transfer unit 32, and outputs the detection signal to the transfer servo circuit 34. The transfer servo circuit 34 obtains the position information of the transfer unit 32, in accordance with this detection signal from the position detector 33, and accordingly serve-controls the movement of the transfer unit 32.

The execution of the above-mentioned operations enables the concave and convex shape corresponding to the embossed pit array and the spiral track to be formed on the stamper disc, and the stamper disc is completed as a cutting die to produce the optical disc. After that, a replication process is carried out by using this stamper disc. Then, the optical disc as a replica disc having the embossed pit array according to the present invention is mass-produced.

Next, a process of cutting the stamper disc, which is carried out in the cutting apparatus according to the first embodiment, will be described below with reference to flowcharts shown in FIG. 6 and FIG. 7. This process is mainly carried out by the CPU 40, in accordance with a control program stored in a memory (not shown).

Figure 6:
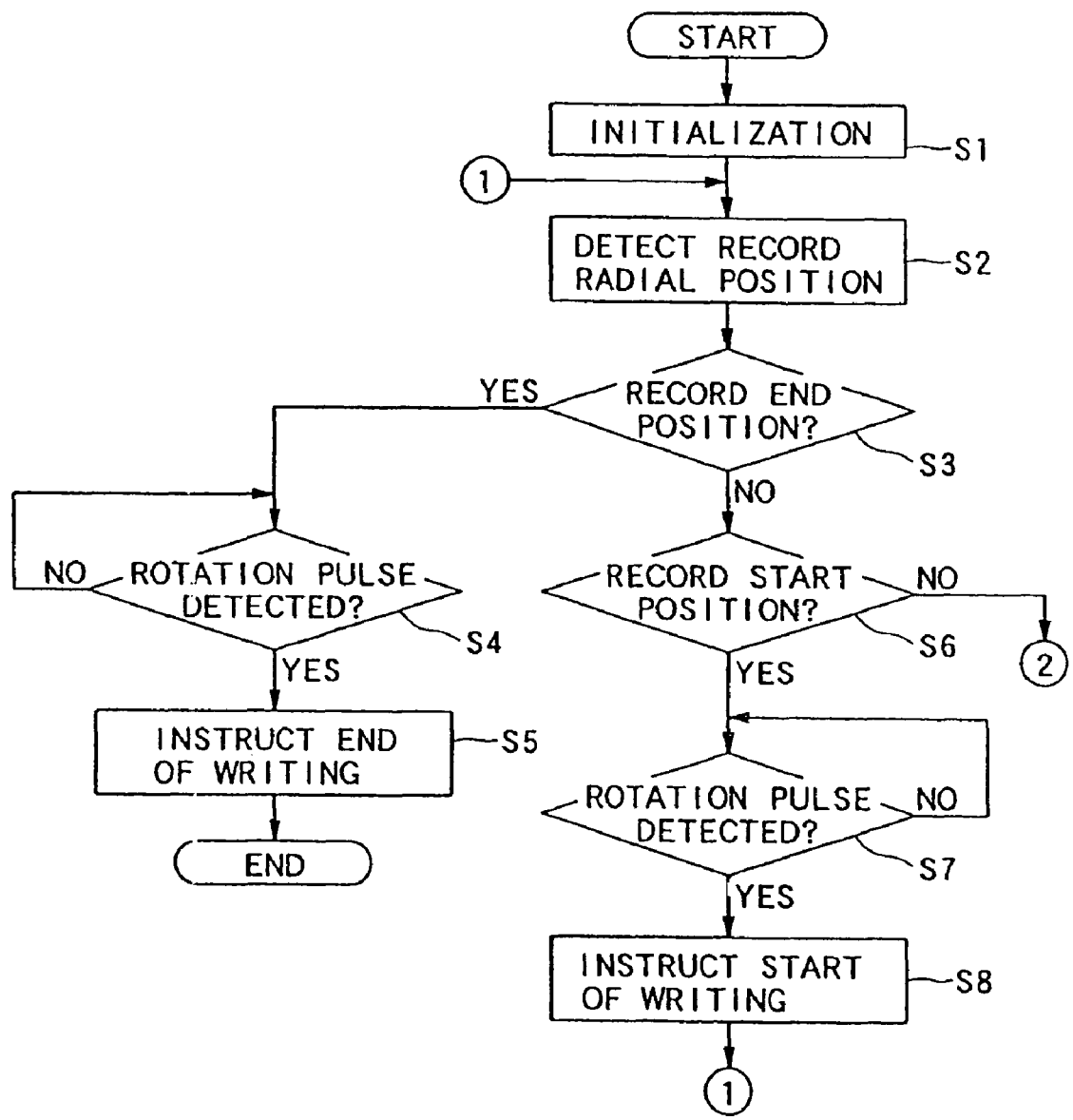
FIG. 6 is a flowchart explaining a process of cutting a stamper disc in the first embodiment.
Figure 7:
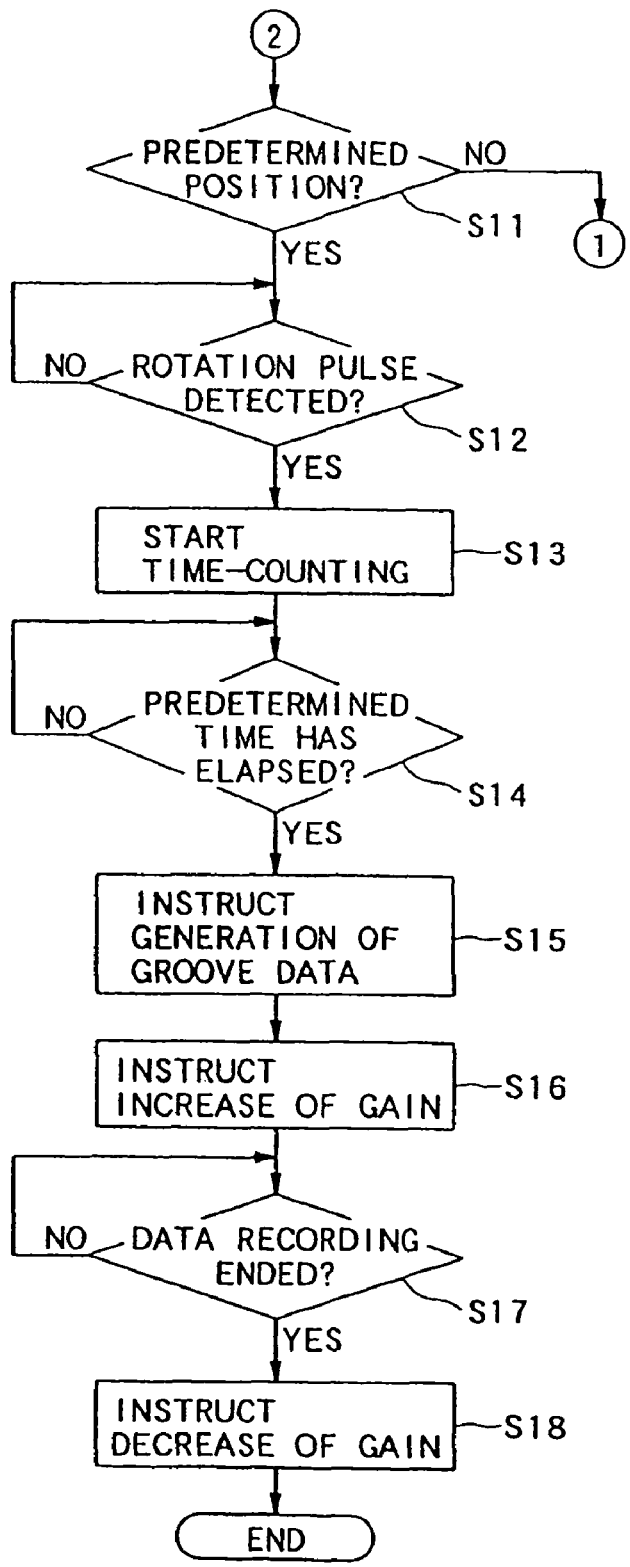
FIG. 7 is a flowchart explaining a cutting operation when it does not reach a record start position, in the process of cutting the stamper disc, in the first embodiment.

As shown in FIG. 6, when the process at the cutting apparatus is started, the initialization is performed on the land data generator 20 and the groove data generator 50 (Step S1), and the predetermined data is set. Next, an irradiation position in a disc radial direction of the light beam is detected in accordance with the detection signal outputted from the position detector 33 (Step S2).

At this time, it is judged whether or not the light beam reaches the record end position on the stamper disc, in accordance with the irradiation position detected at the step S2 (Step S3). That is, it is judged whether or not the irradiated light beam is located at an outermost circumference of the lead-out area 15 of the stamper disc.

As a result, if it is judged that the light beam reaches the record end position (Step S3; YES), the rotation pulse outputted by the rotation servo circuit 31 is detected (Step S4). That is, it is judged whether or not the pre-pits for one round corresponding to the record end position of the information is recorded at the judged record end position.

The process at the step S4 is continued until the detection of the rotation pulse (Step S4; NO). If the rotation pulse is detected (Step S4; YES), the CPU 40 sends the control signal to instruct an end of the writing operation, to the land data generator 20 and the groove data generator 50. Accordingly, the writing process using the land data and the groove data is ended.

On the other hand, as the judged result at the step S3, if the light beam does not reach the record end position (Step S3; NO), it is judged whether or not the light beam reaches the record start position on the stamper disc (Step S6). That is, it is judged whether or not the irradiated light beam is located at an innermost circumference of the lead-in area 13 on the stamper disc.

As a result, if it is judged that the light beam reaches the record start position (Step S6; YES), the rotation pulse outputted by the rotation servo circuit 31 is detected (Step S7). That is, it is judged whether or not the light beam reaches the record standard position in a circumference direction, which is set at one location for one round of the stamper disc, at the judged record start position.

The process at the step S7 is continued until the detection of the rotation pulse (Step S7; NO). If the rotation pulse is detected (Step S7; YES), the CPU 40 sends the control signal to instruct a start of the writing operation, to the land data generator 20 and the groove data generator 50. Accordingly, the writing process using the land data and the groove data is prepared, and then the processes on and after the step S2 are repeated.

On the other hand, as the judged result at the step S6, if the light beam does not reach the record start position (Step S6; NO), the operational flow proceeds to a step S11 (FIG. 7). As shown in FIG. 7, at the step S11, it is judged whether or not the light beam reaches a predetermined position, which is to be treated as a standard on the stamper disc, in accordance with the irradiation position detected at the step S2. This predetermined position is set in advance in the lead-in area 13 on the stamper disc. A position to which data is written as mentioned later can be judged by using the predetermined position as a standard.

As a result, if it is judged that the light beam does not reach the predetermined position (Step S11; NO), the operational flow returns back to the step S2, and the similar processes are repeated. On the other hand, if it is judged that the light beam reaches the predetermined position (Step S11; YES), the rotation pulse outputted by the rotation servo circuit 31 is detected (Step S12). Then, a timing corresponding to the predetermined position is judged for one round of the stamper disc. The process at the step S12 is repeated until the detection of the rotation pules (Step S12; NO).

If the rotation pulse is detected at the step S12 (Step S12 YES), a clocking or time-counting operation is started by using a clocking device controlled by the CPU 40 (Step S13). That is, with the predetermined position as a standard, the clocking operation is performed so as to judge a timing when the light beam reaches the link start point SP of the pre-record data according to this embodiment.

As the clocked result, it is judged whether or not a predetermined time which is set in advance has elapsed (Step S14). This predetermined time can be grasped in advance from the relation between the standard position and the link start point SP. As the judged result at the step S14, if the predetermined time has never elapsed (Step S14; NO), the operational flow waits for the elapse.

On the other hand, as the judged result at the step S14, if the predetermined time has elapsed (Step S14; YES), the CPU 40 instructs the groove data generator 50 to generate the data corresponding to the pre-record data (Step S15). That is, the output of the pre-record data from the groove data is started in order to form on the stamper disc the embossed pit array having the concave and convex shape corresponding to the pre-record data.

In succession, the CPU 40 instructs the variable gain amplifier 52 to increase the gain (Step S16). This intends to compensate the relative drop of the wobbling amplitude at the portion, where the embossed pit array on the stamper disc is formed as mentioned above, by increasing the gain to the wobbling signal. In addition, it is desirable to increase the gain of the variable gain amplifier 52 to about two times that of the normal case.

Then, it is judged whether or not the formation of the embossed pit array corresponding to the pre-record data is ended (Step S17). At this stage, the light beam reaches the link end point EP on the stamper disc. As the judged result at the step S14, if the formation of the embossed pit array is not still ended (Step S17; NO), the similar process is continued.

On the other hand, if the formation of the embossed pit array is ended (Step S17; YES), the CPU 40 instructs the variable gain amplifier 52, which once increased the gain at the step S16, to decrease the gain so as to return the gain back to the normal value (Step S18). In this way, the formation of the embossed pit array onto the stamper disc according to the first embodiment is ended.

As mentioned above, according to the apparatus for manufacturing the information record medium according to the first embodiment, the embossed pit array corresponding to the pre-record data is formed in the pre-record area on the cut stamper disc. Thus, the similar embossed pit array is formed on the optical disc, such as the DVD-RW or the like, produced by using this stamper disc. For this reason, if it is attempted to copy the content of another DVD-ROM, on which the content is recorded, onto the manufactured DVD-RW or the like, it cannot be copied to the pre-record area. For example, the key data with regard to the scramble and the like are lost to thereby disable the content to be appropriately reproduced, which can effectively protect the illegal copy.

Second Embodiment

A second embodiment of the present invention will be described below. Here, an information recording and reproducing apparatus, which records the record information onto and reproduces from a DVD-R, on which the record information can be written one time, is described with reference to FIG. 8 to FIG. 11B.

Figure 8:
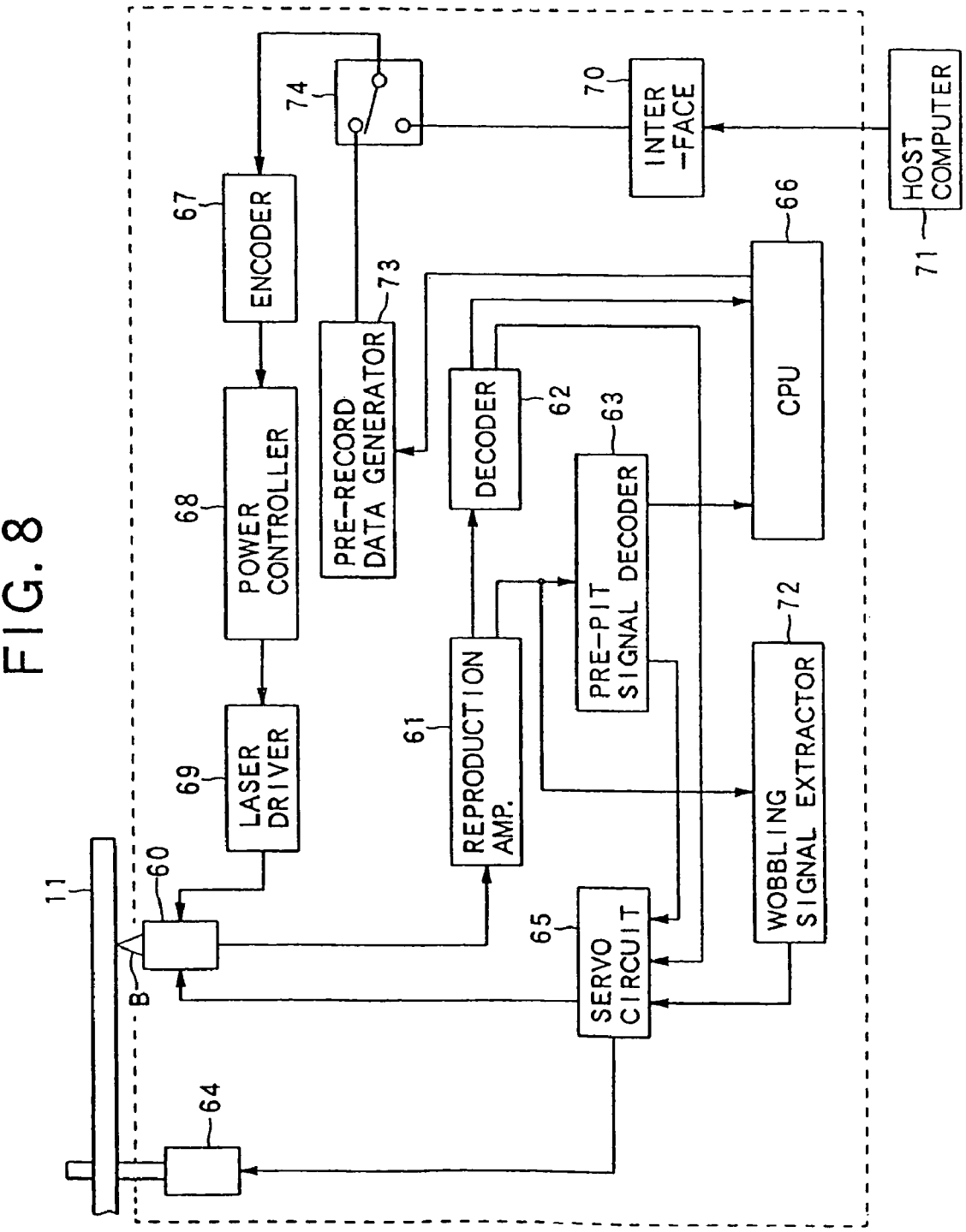
FIG. 8 is a block diagram showing a schematic configuration of an information recording and reproducing apparatus according to a second embodiment.

FIG. 8 is a block diagram showing the schematic configuration of the information recording and reproducing apparatus according to the second embodiment. The information recording and reproducing apparatus shown in FIG. 8 is provided with an optical pickup 60, a reproduction amplifier 61, a decoder 62, a pre-pit signal decoder 63, a spindle motor 64, a servo circuit 65, a CPU 66, an encoder 67, a power controller 68, a laser driver 69, an interface 70, a wobbling signal extractor 72, a pre-record data generator 73 and a switch 74. Also, an external host computer 71 is connected through the interface 70, so that digital data to be recorded is inputted to this information recording and reproducing apparatus.

A DVD-R 11 serving as the information record medium shown in FIG. 8 uses an optical disc employing the organic pigment record film, for example. It has the basic structure based on the above-mentioned DVD format. The wobbling is performed on the groove track, and the pre-pit is pre-formatted on the land track. However, it is assumed that the embossed pit array serving as the pre-record data as described in the first embodiment is not formed.

In FIG. 8, the optical pickup 60 is composed of a laser diode, a polarization beam splitter, an objective lens, a detector and the like which are not shown. Then, the optical pickup 60 irradiates a light beam B onto the information record surface of the DVD-R 11, records data to be recorded only one time, and outputs a detection signal in correspondence with a reflection light of the light beam B.

The reproduction amplifier 61 amplifies the detection signal outputted by the optical pickup 60, and outputs a pre-pit signal corresponding to the pre-pit.

The decoder 62 performs an 8-16 demodulation and a de-interleave on the amplified detection signal, and outputs a demodulated signal. The pre-pit signal decoder 63 decodes the pre-pit signal, and outputs the digital data corresponding to the pattern of the pre-pit.

The servo circuit 65 carries out a focus servo control and a tracking servo control in the optical pickup 60, in accordance with the demodulated signal from the decoder 62. The servo circuit 65 outputs a control signal to control a rotation of the spindle motor 64, in accordance with a later-described wobbling signal.

The CPU 66 collectively controls the information recording and reproducing apparatus as a whole, and obtains respective output signals from the decoder 62 and the pre-pit signal decoder 63, and then controls an operation for writing and reproducing the information onto and from the DVD-R 11.

The encoder 67 is composed of an ECC generator, an 8-16 modulation device, a scramble device and the like which are not shown, and generates an ECC block, which is an error correction unit at a time of reproduction, and then performs an interleave, an 8-16 modulation and the scramble process on the ECC block to thereby generate a modulated signal.

The power controller 68 controls a power of the laser diode in the optical pickup 60, in accordance with the modulated signal outputted by the encoder 67.

The laser driver 69 drives the laser diode in the optical pickup 60, under the control of the power controller 68, so as to emit the light beam B.

The interface 70 carries out an interface operation for inputting the digital data sent from the host computer 71, into the information recording and reproducing apparatus.

The wobbling signal extractor 72 extracts the wobbling signal of the groove track included in the pre-pit signal outputted from the reproduction amplifier 61, and outputs it to the servo circuit 65.

The pre-record data generator 73 generates the digital data corresponding to the pre-record data to be written onto the pre-record area of the DVD-R 11 according to this embodiment, and then outputs the digital data through the switch 74 to the encoder 67.

The switch 74 switches a signal route so that the signal to be outputted to the encoder 67 is sent from the side of the host computer 71 at a time of normal recording and is sent from the side of the data generator 73 at a time of pre-recording.

Figure 9:
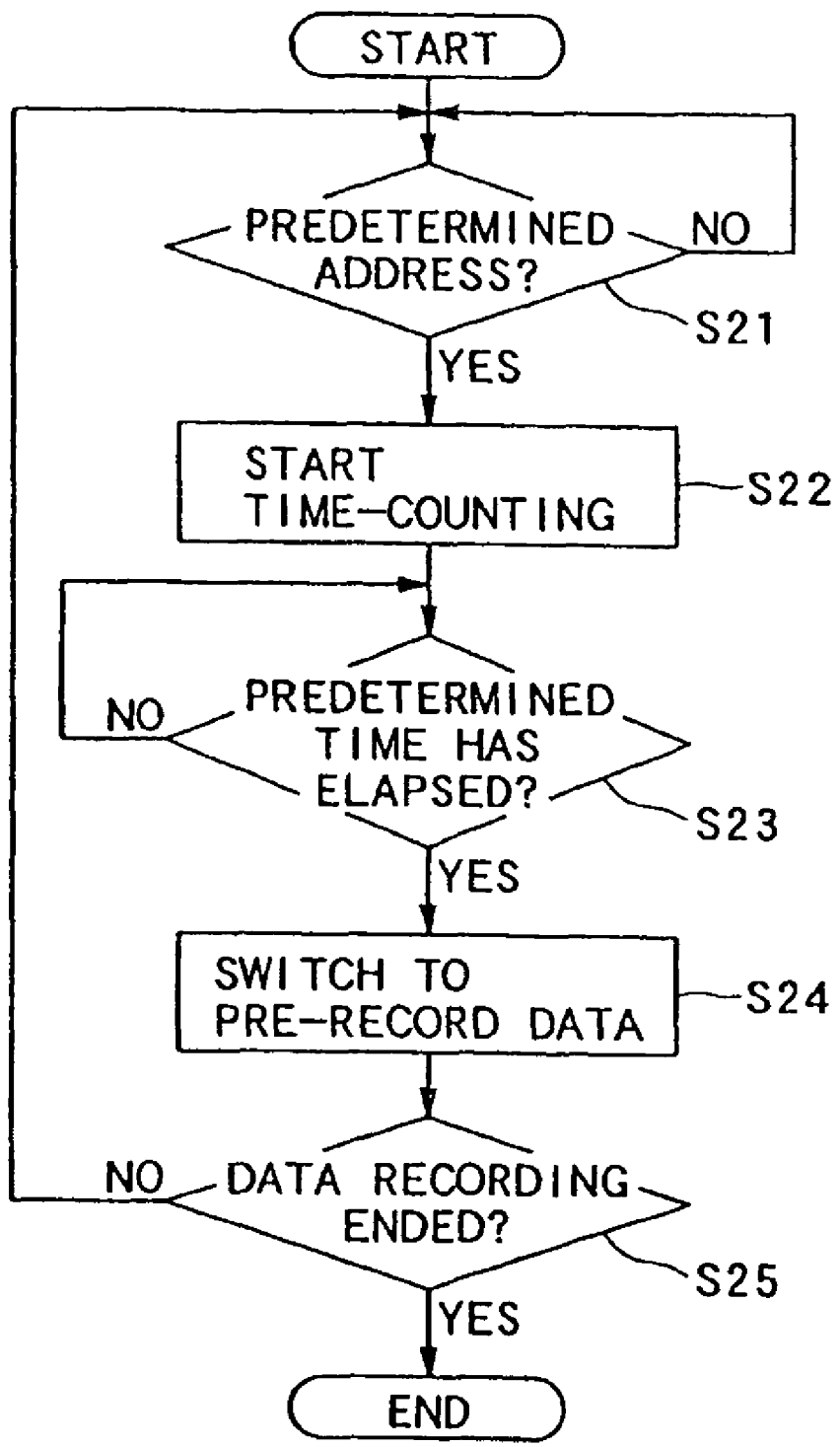
FIG. 9 is a flowchart explaining a process of recording pre-record data onto a DVD-R, in the second embodiment.
Figure 10:
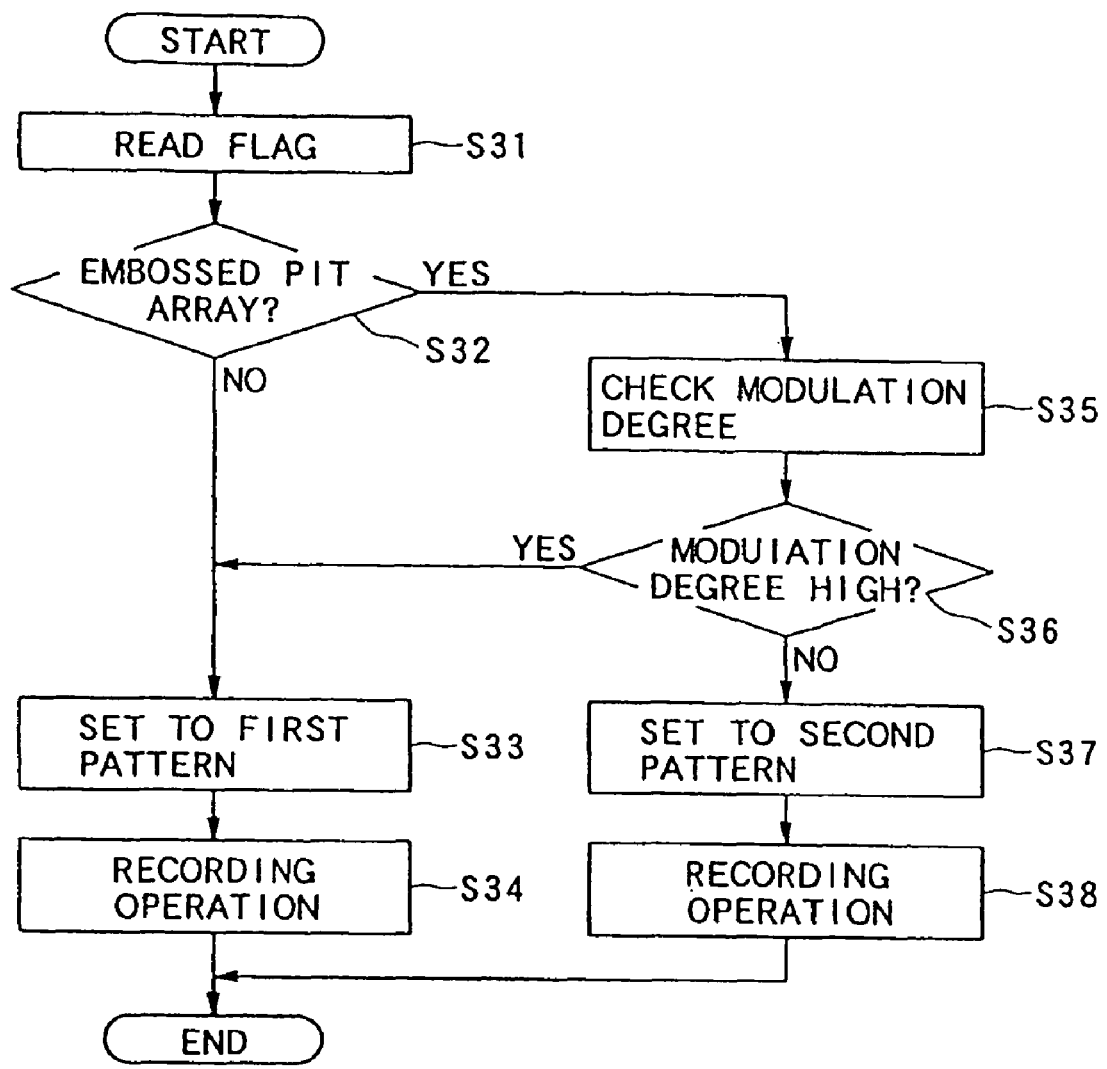
FIG. 10 is a flowchart explaining a process of recording data onto a DVD-R, on which the pre-record data is already recorded, in the second embodiment.

Next, the record process in the information recording and reproducing apparatus according to the second embodiment will be described below with reference to FIG. 9 to FIG. 11B with especially noting the control of the laser power. FIG. 9 is a flowchart showing the recording process of laser-recording the pre-record data onto the DVD-R 11. FIG. 10 is a flowchart showing a process of recording the data onto the DVD-R 11, on which the pre-record data is already recorded. FIG. 11A and FIG. 11B are diagrams showing two kinds of patterns used in the power controller 68. In addition, the processes shown in FIG. 9 and FIG. 10 are mainly carried out by the CPU 66, in accordance with a control program stored in the memory device.

Here, a case is described for writing the pre-record data to the lead-in area 13 in such a condition that a DVD-R 11, on which the embossed pit array is not formed, is set in the information recording and reproducing apparatus. Thus, it is assumed here that an operation for writing the data to be recorded prior to the pre-record data to the lead-in area 13 is started.

As shown in FIG. 9, when the process is started, it is judged whether or not the light beam B reaches a predetermined address to be treated as a standard on the DVD-R 11, in accordance with an irradiation position of the light beam B (Step S21). This predetermined address is recorded in advance, for example, in the pre-pits in the lead-in area 13 on the DVD-R 11. Thus, a position to which the later-described pre-record data is to be written can be judged by reading out this recorded address.

As a result, if it is judged that the light beam B does not reach the predetermined address (Step S21; NO), the operational flow returns back to the step S21, and the similar process is repeated. On the other hand, if it is judged that the light beam B reaches the predetermined address (Step S21; YES), a clocking or time-counting operation is started by using a clocking device controlled by the CPU 66 (Step S22). That is, with the predetermined address as a standard position, the clocking operation is performed so as to judge a timing when the light beam B reaches the start address corresponding to the link start point. SP of the pre-record data according to this embodiment.

As the clocked result, it is judged whether or not a predetermined time set in advance has elapsed (Step S23). This predetermined time can be grasped in advance from the relation between the start address and the address serving as the standard. As the judged result at the step S23, if the predetermined time has never elapsed (Step S23; NO), the operational flow waits for the elapse.

On the other hand, as the judged result at the step S23, if the predetermined time has elapsed (Step S23; YES), the switch 74 is controlled and switched so as to output the pre-record data (Step S24). That is, the connection is switched from the side of digital data to the control data area 13c outputted from the host computer 71 to the side of the pre-record data outputted from the pre-record data generator 73. This switching timing coincides with the link start point SP in the control data area 13c.

Next, it is judged whether or not the record of the pre-record data is ended (Step S25). This end timing coincides with the link end point EP in the control data area 13c.

The operation for recording the pre-record data one time is described in FIG. 9. However, the similar process is actually repeated for the 192 ECC blocks.

In the information recording and reproducing apparatus, the process in a case of recording data in future, other than the pre-record data in the control data area 13c, on the DVD-R 11 on which the pre-record data is already recorded will be described below with reference to FIG. 10. Here, the pre-record data recorded on the DVD-R 11 may be formed of the embossed pit array by using the method according to the first embodiment or may be laser-recorded by using the method shown in the flowchart of FIG. 9.

As shown in FIG. 10, when the record process in the information recording and reproducing apparatus is started, a flag is read, which indicates whether the targeted pre-record data on the DVD-R 11 is formed by using the embossed pit array or written by the laser record (Step S31). That is, as mentioned above, since there are two kinds of cases that the pre-record data is formed of the embossed pit array and is laser-recorded on the DVD-R 11, in the second embodiment, when the data is written to the control data area 13c, this flag is employed in the DVD-R 11 as means for discriminating between those two kinds of cases. For example, this flag can be assigned to a predetermined area of the control data area 13c.

Next, a process to be executed is judged from the read flag, in accordance with the method for recording the pre-record data on the DVD-R 11 (Step S32). As the judged result at the step S32, if the pre-record data is written onto the DVD-R 11 by using the laser record and by not using the embossed pit array (Step S32; NO), a pattern for the laser power control in the power controller 68 is set to a first pattern shown in FIG. 11A (Step S33).

The first pattern is used to carry out the actual recording operation onto the DVD-R 11 (Step S34). After this recording operation, the process is ended. As shown in FIG. 11A, there are a reproduction power to reproduce the data and a record power to record the data, in the controlled laser power. The power becomes stronger in the order of (i) the DC level serving as a standard of the laser power, (ii) the reproduction power and (iii) the record power. According to the first pattern, the data other than the pre-record data is recorded at the record power. On the other hand, in order to avoid the overwrite to the pre-record data, the control is performed such that the laser power is reduced to the reproduction power in the area of the pre-record data. In addition, the reason why this laser power is not made weaker than the reproduction power is to make the laser control easier.

On the other hand, as the judged result at the step S32, if the embossed pit array is formed on the DVD-R 11 (Step S32 YES), a modulation degree of the detection signal corresponding to the embossed pit array is measured in succession (Step S35). That is, as mentioned above, there may be a case that the pigment film coated on the embossed pit array causes the modulation degree to be dropped when the pre-record data is reproduced. Thus, the modulation degree is checked at this stage in order to carry out a later-described countermeasure.

Next, the magnitude of the measured modulation degree is judged (Step S36). As a result, if it is judged that the modulation degree is high (Step S36; YES), the countermeasure is not especially required. Thus, the pattern for the laser power control is set to the first pattern (Step S33). On the other hand, if it is judged that the modulation degree is low (Step S36; NO), the pattern for the laser power control is set to a second pattern shown in FIG. 11B, as the countermeasure (Step S37).

Then, the second pattern is used to carry out the actual recording operation on to the DVD-R 11 (Step S38). After this recording operation, the process is ended. According to the second pattern, the data other than the pre-record data is recorded at the record power. Similarly, the control is performed so as to maintain the recording operation at the record power, even in the area of the pre-record data. Accordingly, although the embossed pit array itself does not receive the affection, the modulation degree can be recovered when the pre-record data is reproduced after the removal of the pigment film on the embossed pit array.

As described above, according to the information recording and reproducing apparatus in the second embodiment, the pre-record data is recorded in future on the DVD-R on which the embossed pit array is not initially formed. For this reason, similarly to the first embodiment, if the illegal copy of the content of another DVD-ROM on which the content is recorded is tried, the content cannot be copied to the pre-record area, which accordingly enables the illegal copy to be effectively protected.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

For example, in the above described embodiment, the pre-record area is one portion of the ECC block as shown in FIG. 4. However, all the area in the control data area shown in FIG. 3 may be the pre-record area. In this case, the link start point and the link end point of the pre-record area may be arranged to slightly exceed the control data area, so as not to overlap the synchronization code in the control data area.

The entire disclosure of Japanese Patent Application No. 11-140636 filed on May 20, 1999 including the specification, claims, drawings and summary is incorporated herein by reference in its entirety.

What is claimed is:

1. An apparatus for forming a stamper for use in manufacturing an information record medium having a wobbled track on which record information can be recorded, comprising:
an embossed pit array forming device for forming a wobbled embossed pit array on a predetermined area on the stamper; and
a wobbling amplitude adjusting device for adjusting a wobbling amplitude of the embossed pit array to be greater than a wobbling amplitude of the track located out of the predetermined area, wherein the predetermined area includes an area corresponding to a record area in a read-only record medium, the record area being on which reproduction control information to control reproduction in the read-only record medium is recorded, and the predetermined area and the area corresponding to the record area are located within a lead-in area.

2. The apparatus according to claim 1, wherein the read-only record medium is DVD-ROM, and the information record medium is DVD-RW.

3. The apparatus according to claim 1, wherein the reproduction control information is a disc production information included in each ECC block in control data area.

4. A method of forming a stamper for use in manufacturing an information record medium having a wobbled track on which record information can be recorded, comprising:

an identifying process of identifying a predetermined area on the stamper; and an embossed pit array forming process of forming a wobbled embossed pit array on the identified predetermined area, wherein a wobbling amplitude of the embossed pit array on the predetermined area is adjusted to be greater than a wobbling amplitude of the track located out of the predetermined area, the predetermined area includes an area corresponding to a record area in a read-only record medium, the record area being on which reproduction control information to control reproduction in the read-only record medium is recorded, and the predetermined area and the area corresponding to the record area are located within a lead-in area.

5. The method according to claim 4, wherein the read-only record medium is DVD-ROM, and the information record medium is DVD-RW.

6. The method according to claim 4, wherein the reproduction control information is a disc production information included in each ECC block in control data area.

7. An information record medium having a wobbled track on which record information can be recorded, wherein a wobbled embossed pit array is formed on a predetermined area on the information record medium, a wobbling amplitude of the embossed pit array on the predetermined area is adjusted to be greater than a wobbling amplitude of the track located out of the predetermined area, the predetermined area includes an area corresponding to a record area in a read-only record medium, the record area being on which reproduction control information to control reproduction in the read-only record medium is recorded, and the predetermined area and the area corresponding to the record area are located within a lead-in area.

8. The information record medium according to claim 7, wherein the read-only record medium is DVD-ROM, and the information record medium is DVD-RW.

9. The information record medium according to claim 7, wherein the reproduction control information is a disc production information included in each ECC block in control data area.

* * * * *